United States Patent
Tsai et al.

(10) Patent No.: US 7,139,295 B2
(45) Date of Patent: Nov. 21, 2006

(54) TUNABLE WAVELENGTH LOCKER, TUNABLE WAVELENGTH SPECTRUM MONITOR, AND RELATIVE WAVELENGTH MEASUREMENT SYSTEM

(75) Inventors: John C. Tsai, Saratoga, CA (US); David W. Wang, Saratoga, CA (US)

(73) Assignee: Fibera, Inc., Santa Clara, CA (US)

( * ) Notice: Subject to any disclaimer, the term of this patent is extended or adjusted under 35 U.S.C. 154(b) by 203 days.

(21) Appl. No.: 10/707,950

(22) Filed: Jan. 27, 2004

(65) Prior Publication Data

US 2004/0151216 A1    Aug. 5, 2004

Related U.S. Application Data

(60) Provisional application No. 60/319,907, filed on Jan. 27, 2003.

(51) Int. Cl.
*H01S 3/10* (2006.01)
(52) U.S. Cl. ............... 372/20; 372/29.014; 372/29.016
(58) Field of Classification Search ................. 372/20, 372/29.014, 29.016
See application file for complete search history.

(56) References Cited

U.S. PATENT DOCUMENTS

| 6,518,563 | B1 * | 2/2003 | Broutin et al. ............... 250/226 |
| 6,888,856 | B1 * | 5/2005 | Green et al. ................... 372/20 |
| 2001/0017876 | A1 * | 8/2001 | Kner et al. .................... 372/50 |
| 2003/0174743 | A1 * | 9/2003 | Cliche et al. .................. 372/20 |

* cited by examiner

*Primary Examiner*—Minsun Oh Harvey
*Assistant Examiner*—Dung (Michael) T. Nguyen
(74) *Attorney, Agent, or Firm*—Raymond E. Roberts; Intellectual Property Law Offices

(57) ABSTRACT

A system for tuning the wavelength of a beam from a tunable laser. A tunable etalon assembly includes a Fabry-Perot etalon with paired reflectors to filter the laser beam. The tunable etalon also includes a thermal unit to thermally adjust the separation of the paired responsive to an etalon tuning signal. A photodetector receives the laser beam after filtering the etalon and generates a detected signal based on intensity. A controller generates the etalon tuning signal, and receives the detected signal and generates a laser tuning signal based on it. Optionally, additional Fabry-Perot etalons, photodetectors, and one or more beamsplitters permit extending wavelength range and determining relative wavelength difference with a beam from a second laser.

11 Claims, 9 Drawing Sheets

| ITU Frequency (GHz) | Etalon Temperature (°C) | Etalon Spacer Length (mm) |
|---|---|---|
| 196100 | 14.0 | 2.844 |
| 196000 | 14.8 | 2.852 |
| 195900 | 15.6 | 2.860 |
| 195800 | 16.4 | 2.867 |
| 195700 | 17.2 | 2.875 |
| 195600 | 18.0 | 2.883 |
| 195500 | 18.8 | 2.891 |
| 195400 | 19.6 | 2.899 |
| 195300 | 20.4 | 2.906 |
| 195200 | 21.2 | 2.914 |
| 195100 | 22.0 | 2.922 |
| 195000 | 22.8 | 2.930 |
| 194900 | 23.6 | 2.938 |
| 194800 | 24.4 | 2.945 |
| 194700 | 25.2 | 2.953 |
| 194600 | 26.0 | 2.961 |
| 194500 | 26.8 | 2.969 |
| 194400 | 27.6 | 2.977 |
| 194300 | 27.6 | 2.984 |
| 194200 | 29.2 | 2.992 |
| 194100 | 30.0 | 3.000 |
| 194000 | 30.8 | 3.008 |
| 193900 | 31.6 | 3.016 |
| 193800 | 32.4 | 3.023 |
| 193700 | 33.2 | 3.031 |
| 193600 | 34.0 | 3.039 |
| 193500 | 34.8 | 3.047 |
| 193400 | 35.6 | 3.055 |
| 193300 | 36.4 | 3.062 |
| 193200 | 37.2 | 3.070 |
| 193100 | 38.0 | 3.078 |
| 193000 | 38.8 | 3.086 |
| 192900 | 39.6 | 3.094 |
| 192800 | 40.4 | 3.101 |
| 192700 | 41.2 | 3.109 |
| 192600 | 42.0 | 3.117 |
| 192500 | 42.8 | 3.125 |
| 192400 | 43.6 | 3.133 |
| 192300 | 44.4 | 3.140 |
| 192200 | 45.2 | 3.148 |

TBL. 1

TUNABLE WAVELENGTH LOCKER, TUNABLE WAVELENGTH SPECTRUM MONITOR, AND RELATIVE WAVELENGTH MEASUREMENT SYSTEM

CROSS REFERENCE TO RELATED APPLICATIONS

This application claims the benefit of U.S. Provisional Application No. 60/319,907, filed Jan. 27, 2003.

BACKGROUND OF INVENTION

1. Technical Field

The present invention relates generally to systems for generating and using coherent light, and more particularly to determining and controlling the frequency of light used in such systems. It is anticipated that a primary application of the present invention will be in telecommunications, but the present invention is also well suited for use in laboratory measurement and other fields.

2. Background

The Fabry-Perot etalon has long been used for stabilizing laser frequencies, and the confocal etalon is now starting to see similar use. Due to its wide use, the Fabry-Perot etalon is used in the examples here, but it should be appreciated that the scope of what we present here is not limited to only that device. It should also be noted that the terms "frequency" and "wavelength" are used interchangeably in the following discussion.

In a typical fiber optics application, the spacing between the two reflectors of a Fabry-Perot etalon assembly is fixed and the resonant spectrum (transmissive or reflective) coincides with the ITU grids, which come in increments of 200 GHz, 100 GHz, 50 GHz, . . . , etc. This type of arrangement is termed a "wavelength locker" in the telecommunications industry.

FIG. 1 (background art) is a block diagram that conceptually shows the structures of two Fabry-Perot etalons that are commonly used in wavelength lockers for fixed wavelength applications. The first of these is etalon 10, an "air spaced etalon" as discussed below. It comprises two light transmissive plates 12 each having a partially reflective surface, i.e., reflectors 14. The reflectors 14 are separated apart a distance $L_1$ by two spacers 16, thus defining a chamber 18 that contains a medium with a refractive index, $n_1$.

The second Fabry-Perot device in FIG. 1 is etalon 20, a "solid etalon" as also discussed below. This comprises one light transmissive block 22 having two partially reflective surfaces, reflectors 24, separated apart a distance $L_2$. The material of the block 22 is a medium having a refractive index, $n_2$.

Numerous variations of Fabry-Perot etalons such as those in FIG. 1 are possible, for manufacturing convenience, etc. For example, the shape of the structure supporting the reflective surfaces can be either rectangular or round, and either two rectangular bars or a single cylinder can be used to separate the reflective surfaces.

FIG. 2 (background art) is a graph 30 showing a typical transmissive spectrum 32 of a wavelength locker. The relationship of frequency verses transmission intensity is depicted with a peak-valley curve 34, wherein adjacent peaks 36 define a free spectral range (FSR 38). For instance, 50 GHz.

FIG. 3 (background art) is a graph 40 showing, in simplified manner, the principle of a conventional wavelength locker using a Fabry-Perot etalon (e.g., etalons 10, 20).

When laser light is injected into the etalon its frequency falls somewhere on a peak-valley curve 42 that is characteristic for the particular etalon. The etalon is normally pre-calibrated so that this occurs in a shoulder region 44, typically centered about the 50% point with respect to amplitude on the ITU grids 46. The laser frequency of the wavelength locker is then normally adjusted to this 50% point, termed a lock point 48, and kept there by use of a servo control circuit. The laser frequency will thereafter remain stable as long as the peak-valley curve of the etalon does not drift.

In the etalons 10, 20 of FIG. 1, the spacings $L_1$, $L_2$ between the respective reflectors 14, 24 determine the FSR 38 of the resonant (transmissive or reflective) spectrum according to the equation:

$$FSR = c/(2*n*L) \quad \text{EQ. 1}$$

where c is the speed of light in vacuum and n ($n_1$ or $n_2$ as the case may be in FIG. 1) is the refractive index of the medium between the respective set of two reflectors 14.

In the case of the air spaced etalon 10, when the medium between the reflectors 14, 24 is vacuum, n=1 and the only parameter that affects the FSR 38 is the spacing $L_1$. When the medium between the paired reflectors 14 is air, $n_1 \sim 1.000273$ and the refractive index follows the Edlen equation (EDLEN, B., "The Refractive Index of Air," Metrologia, 2, 71–80, 1966). An etalon of this type is generally called an "air spaced etalon," regardless of whether the medium is vacuum, air, or some other gas mixture.

In the case of the solid etalon 20, when the block 22 is glass, $n \sim 1.5$ and the Fabry-Perot etalon effectively consists of a single piece of sold glass having both reflectively coated reflectors 24 parallel to each other. An etalon of this type is generally called a "solid etalon," and the term "glass" may loosely mean any transparent solid medium.

The spacing $L_1$, $L_2$ between the reflectors 14, 24 is maintained constant so that the FSR 38 does not change during usage. This is achieved by using a material for the spacers 16 or block 22 (i.e., a medium) that has a low thermal expansion coefficient. Materials with such expansion coefficients are currently commercially available from Corning Glass™ in the U.S. and from Schott Glass™ in Germany (e.g., Zerodur™). These glass materials exhibit nearly zero thermal expansion in the environment typically required for telecommunications.

In addition to maintaining the spacing L constant, a process to keep the refractive index n constant has also been invented by Fibera, Inc. of Santa Clara, Calif. This process makes the wavelength locker "a thermal" and provides superior functionality throughout a very wide temperature range.

Such fixed spacing arrangements are fine, so long as the laser frequency does not have to be varied to achieve the underlying application. However, there are applications that require tuning the laser frequency through the ITU grids in a steady fashion, while also maintaining the frequency stability of the laser. A "tunable" wavelength locker would therefore be very useful for providing both frequency stabilization and tunability.

From in EQ. 1 it can be appreciated that tuning a wavelength locker can be achieved by varying either "L" or "n" in a controlled manner. First, consider tuning the FSR by varying "n." This can be accomplished by changing conditions present in the wavelength locker package. From Eden's work, noted above, it is known that the refractive index of air is a function of pressure, humidity, and temperature. One of these parameters can therefore be precalculated and used to implement tuning. In actuality, however, this is not an easy process to accomplish. For example, the presence of a pressure adjusting device is usually not possible in the field.

Next, consider mechanically tilting the Fabry-Perot with respect to the incident laser beam, that is, effectively changing L. By doing this the optical path between the reflective surfaces is changed so that tuning is also achieved. However, this approach requires a motive means (e.g., a motor) to perform the tilting, and the addition of such a means to the wavelength locker is also undesirable in the field. For example, in the telecommunications field the constraints on space, with respect to both footprint and volume, can be quite severe. Recently there has been significant progress in MEMS technology, and tilting an etalon with a MEMS motor might be possible in the near future, but his does not address present needs.

Accordingly, there remains a need for a system to provide both frequency stabilization and tunability.

SUMMARY OF INVENTION

Accordingly, it is an object of the present invention to provide systems to provide both frequency stabilization and tunability.

Briefly, one preferred embodiment of the present invention is a system for tuning the wavelength of a laser beam emitted by a tunable laser. A tunable etalon assembly is provided that includes a Fabry-Perot ("FP") etalon and a thermal unit. The FP etalon has paired reflectors to receive and wavelength filter the laser beam. The thermal unit thermally effects the separation of the paired reflectors in response to an etalon tuning signal. A photodetector receives the laser beam after filtering by the FP etalon and generates a detected signal based on the transmitted intensity. A generates the etalon tuning signal, and receives the detected signal and generates a laser tuning signal based on it.

Briefly, another preferred embodiment of the present invention is a system for determining how much the wavelength of a laser beam emitted by a tunable laser has been tuned. A beamsplitter receives and splits the laser beam into first and second beam portions. A tunable etalon assembly is provided that includes a first Fabry-Perot ("FP") etalon and a thermal unit. The first FP etalon has paired reflectors to receive and wavelength filter the first beam portion. The thermal unit thermally effects the separation of the paired reflectors in response to an etalon tuning signal. A first photodetector receives the first beam portion after filtering and generates a first detected signal based on transmitted intensity. A second FP etalon receives and wavelength filters the second beam portion. A second photodetector receives the second beam portion after filtering and generates a second detected signal based on transmitted intensity. A controller generates the etalon tuning signal, receives the detected signal and generates a laser tuning signal based on it, receives the second detected signal and counts peak-valley cycles therein.

Briefly, another preferred embodiment of the present invention is a system for determining the difference in wavelengths of first and second laser beams emitted by first and second tunable lasers. A first beamsplitter receives and splits the first laser beam into first and second beam portions. A coupler alternately receives and redirect either of the second beam portion and the second laser beam as a tuning beam portion. A first Fabry-Perot ("FP") etalon receives and wavelength filters the first beam portion. A first photodetector receives the first beam portion after filtering and generates a first detected signal based on transmitted intensity. A tunable etalon assembly is provided that includes a tuning FP etalon and a thermal unit. The tuning FP etalon has paired reflectors to receive and wavelength filter the tuning beam portion. The thermal unit thermally effects the separation of the paired reflectors in response to an etalon tuning signal. A tuning photodetector receives the tuning beam portion after filtering and generates a tuning detected signal based on transmitted intensity. A controller receives the first detected signal, generates a first tuning signal based thereon to tune the first tunable laser to emit the first laser beam at a specific known wavelength, and controls the first tuning signal to servo lock the first laser beam to the known wavelength. The controller also generates the etalon tuning signal such that the tuning detected signal is at a known point on a peak-valley curve for the tuning FP etalon. The controller records a first value for the etalon tuning signal when the tuning beam portion comes from the first laser beam and the tuning detected signal is at the known point. The controller also records a second value for the etalon tuning signal when the tuning beam portion comes from the second laser beam. The controller generates the etalon tuning signal such that the second value matches the first and reports on the first and second tuned values via an output link.

The objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF DRAWINGS

The purposes and advantages of the present invention will be apparent from the following detailed description in conjunction with the appended figures of drawings and table in which:

FIGS. 6a and 6b are perspective views of two etalon assemblies that may be used in the tunable wavelength locker of FIG. 4, wherein FIG. 6 depicts an etalon assembly including an etalon wrapped with a heating element and FIG. 6b depicts an etalon assembly including an etalon mounted on a thermal-electric cooler that provides a thermal effect.

And TBL. 1 is a table presenting an example set of ITU frequency verses etalon temperature and length look-up data that is suitable for use in embodiments of the invention.

DETAILED DESCRIPTION

Preferred embodiments of the present invention are a tunable wavelength locker, a tunable wavelength spectrum monitor, and a relative wavelength measurement system. Briefly, the invention uses a thermal effect, either heating or cooling, to vary the spacing between the reflective surfaces of an etalon used in a wavelength locker, wavelength spectrum monitor, or relative wavelength measurement system.

Figure 4:
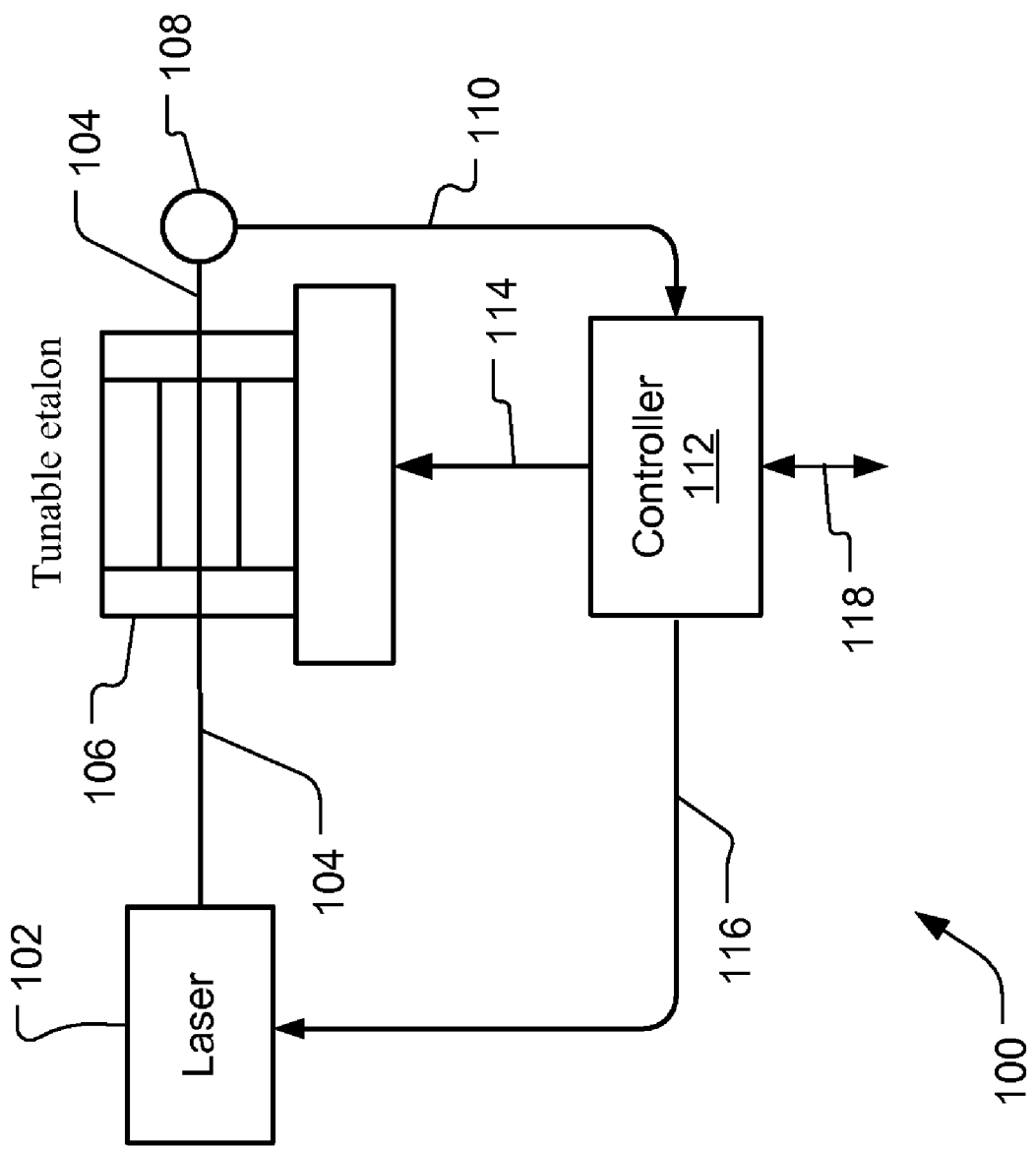
FIG. 4 is a block diagram showing a tunable wavelength locker in accord with the present invention.

FIG. 4 is a block diagram showing a tunable wavelength locker 100 in accord with the present invention. A tunable laser 102 is used to produce a laser beam 104 having a particular wavelength. The laser beam 104 is passed through a tunable etalon assembly 106 (described presently) to a photodetector 108. Based upon the energy then remaining in the laser beam 104, the photodetector 108 provides a detected signal 110 to a controller 112. The controller 112 stylistically depicted here generally represents all of the control functionality of the tunable wavelength locker 100. It adjustably provides an etalon tuning signal 114 to the tunable etalon assembly 106; it adjustably provides a laser tuning signal 116 to the tunable laser 102; and it can receive or provide input and output via an I/O link 118 (represented with an arrowed line) with an outside system (not shown).

The adjustable characteristic of the etalon tuning signal 114 can be any that permits controllably changing the spacing of the reflective surfaces (reflectors) of the tunable etalon assembly 106. For most applications this can simply be electrical current. The etalon tuning signal 114 is based, all or in substantial part, on input provided in the I/O link 118.

The adjustable characteristic of the laser tuning signal 116 can be any that permits changing the particular wavelength of the laser beam 104 which the tunable laser 102 produces. This can be electrical current, voltage, a combination of these, or yet some other characteristic. The laser tuning signal 116 is based, all or in substantial part, on the detected signal 110.

The adjustable characteristic of the input from the I/O link 118 may be merely a manual adjustment by a user (e.g., operating switches or turning a rheostat), or it may be a complex electrical or optical signal provided by the application employing the tunable wavelength locker 100, or it may come from an outside system entirely. In some embodiments the detected signal 110 and the laser tuning signal 116 can be the same, bypassing the controller 112 entirely if desired. All of this is largely a matter of design choice and is well within the capabilities of one of ordinary skill in the art when all of the teachings herein are appreciated.

Figure 5:
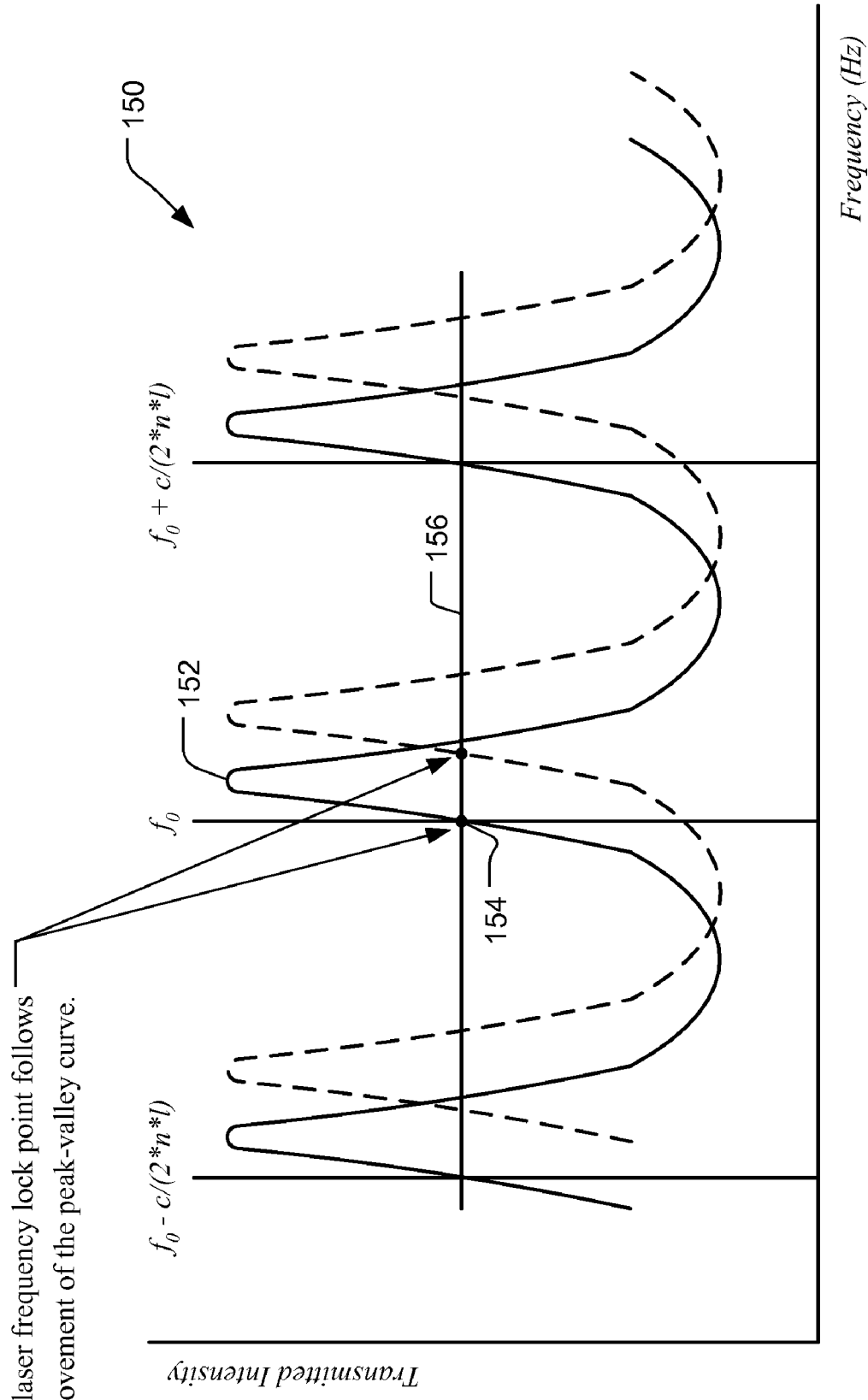
FIG. 5 is a graph showing, in simplified manner, the principle employed by the tunable wavelength locker of FIG. 4.

FIG. 5 is a graph 150 showing, in simplified manner, the principle employed by the tunable wavelength locker 100 of FIG. 4. The frequency verses intensity relationship of the laser beam 104 after the tunable etalon assembly 106 is represented by a peak-valley curve 152. In the tunable wavelength locker 100 the peak-valley curve 152 can be "shifted" in a controlled manner by tuning the tunable etalon assembly 106 with the etalon tuning signal 114. In actuality the peak-valley curve 152 does not simply shift. Rather, the free spectral range (FSR) increases or decreases.

When the tunable laser 102, the photodetector 108, the detected signal 110, and the laser tuning signal 116 are used in a servo-control manner the frequency of the laser beam 104 shifts accordingly. Thus, when the frequency of the laser beam 104 is locked at a designated lock point 154, varying the etalon tuning signal 114 "moves" the lock point 154 along a line 156.

Figure 6A:
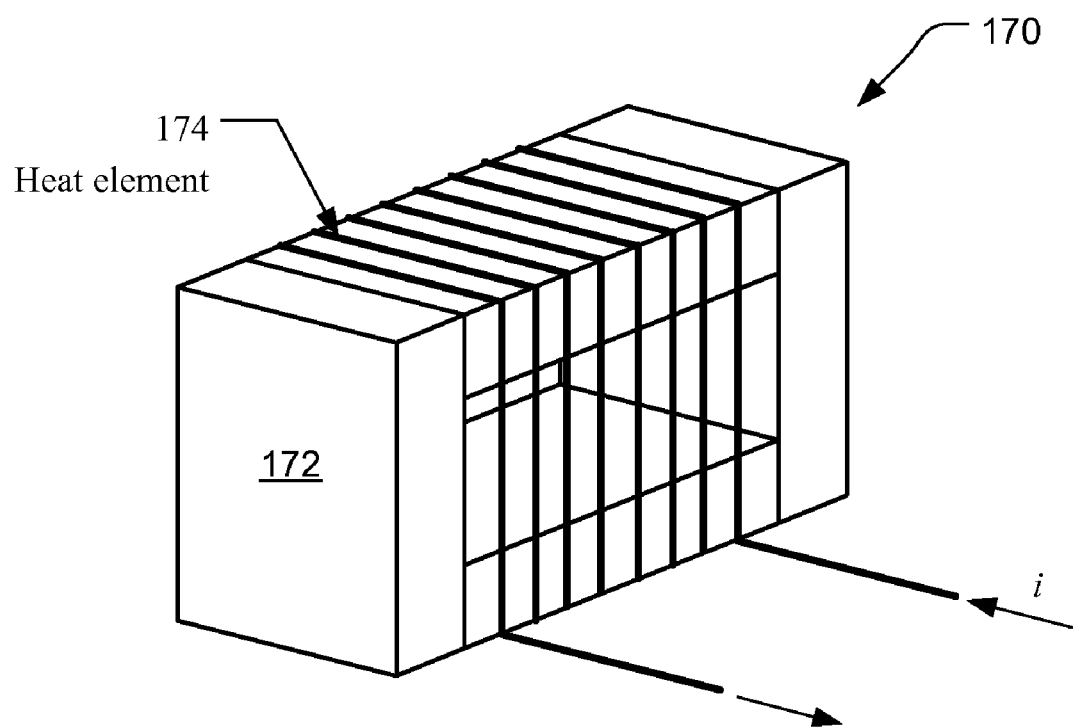
Figure 6B:
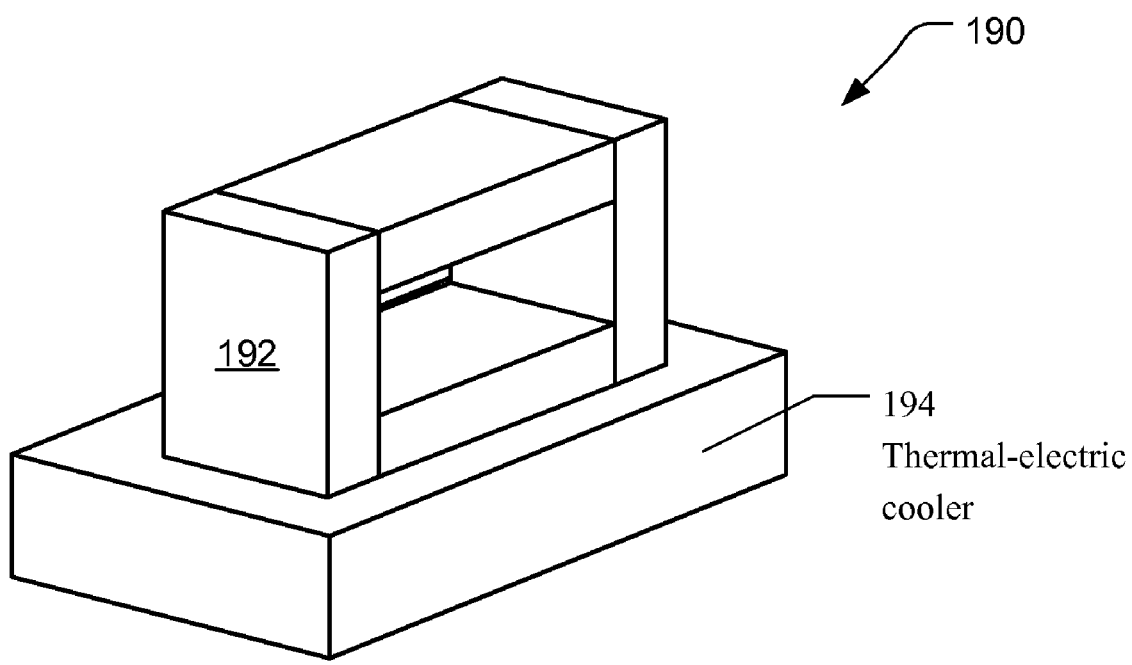

FIGS. 6a and 6b are perspective views of two etalon assemblies that may be used in the tunable wavelength locker 100 of FIG. 4. FIG. 6a depicts an etalon assembly 170 including an etalon 172 wrapped with a heating element 174 (say, heating tape or wire, for example). In this arrangement the etalon 172 operates in conventional manner and the heating element 174 provides a thermal effect. The heating element 174 is connected to a conventional power source (e.g., within the controller 112), and straightforward adjustment of the power in the etalon tuning signal 114 controls the shift of the peak-valley curve 152 of the etalon 172 in the manner shown in FIG. 5.

FIG. 6b depicts an etalon assembly 190 including an etalon 192 mounted on a thermal-electric cooler (TEC 194) that provides a thermal effect here. TECs are quite flexible, and the term "cooler" the industry uses can be somewhat misleading. A TEC can be used to cool, to heat, or to alternately cool and head, as required. The TEC 194 here is also connected to a conventional power source (e.g., within the controller 112), permitting straightforward adjustment with the power in the etalon tuning signal 114 to controllably shift the peak-valley curve 152 of the etalon 192 in the manner shown in FIG. 5.

In the actual employment of these etalon assemblies 170, 190 a conventional temperature sensor (not shown) can be installed, preferably adjacent to the etalon optics, and used to monitor and report the temperature to the controller 112. The controller 112 can then control the power in the etalon tuning signal 114 So that the proper thermal effect is achieved to tune the etalon assembly 170, 190 to a desired frequency.

Continuing with FIG. 6a, in use the etalon 172 can first be warmed up to a predetermined temperature and allowed to cool down at a desired rate when the power in the etalon tuning signal 114 is reduced. This permits controlled, stable setting of the etalon 172 initially, and then enables adjusting in an ongoing manner, either by heating it up (by increasing the power) or by cooling it down (by decreasing the power). The free spectral range of the etalon 172 can therefore be increased or decreased at will.

The embodiment in FIG. 6b operates similarly, only even more flexibly. Here the etalon 192 is first brought to a predetermined temperature, by heating or cooling. Then its free spectral range is increased or decreased, as desired, by changing its temperature up or down, as needed. Unlike the embodiment in FIG. 6a, where heating above the ambient temperature is typically needed to provide both increasing and decreasing the free spectral range of the etalon 172, the expected average ambient temperature may be chosen as the predetermined temperature here, thus tending to minimize the power needed and also tending to minimize any thermal influence on surrounding elements or systems.

FIGS. 6a and 6b both depict tunable etalon assemblies 170, 190 having air-spaced etalons 172, 192, but this is not a requirement. For a solid etalon, the thermal effect can be applied to the solid glass in essentially similar manner. When a solid etalon is used, however, the refractive index of the glass medium is not linearly proportional to temperature variation and a more sophisticated algorithm is required to control the heating or cooling. For example, a look-up table that contains values of the refractive index verses the temperature of the glass can be provided to supply values for when the solid etalon reaches a certain temperature (see e.g., TBL. 1).

In contrast to the conventional practice in etalon construction of using spacers or glass mediums with low thermal expansion, the inventors prefer to use materials that have higher thermal expansion coefficients. In this manner, a small change in the heat energy applied or removed can cause an appropriate elongation or shrinkage of the spacer or glass medium. The materials used desirably have good stiffness and thermal conductivity. An appropriate stiffness maintains component alignment and good thermal conductivity shortens the time required to perform tuning. All of this can also help avoid over heating or over cooling the etalon. The inventors have identified several materials that have high thermal expansion coefficients with good stiffness and thermal conductivity. Some examples, without limitation, include PTFE (Teflon ™), Derlin, and ABS.

Turning now to a "real world" example using an air spaced etalon, the typical tuning range in a telecom application is the gain bandwidth of the laser medium, which is approximately 4 nm. For the 50 GHz ITU grid, the spacer length is 3 mm (EQ. 1). The condition for a standing wave to exist in a Fabry-Perot etalon is:

$$L = m * \lambda/2$$

where L is the spacer length, m is an integer, and $\lambda$ is the resonant wavelength. One can then calculate the required length change for the spacer (by using the center wavelength (1,544.33 nm) of the ITU grid as an example). Using $\lambda_0 = 1,544.33$ nm and the same value for "m" (i.e., the same order), it follows that:

$$L_1/L_0 = \lambda_1/\lambda_0 \text{ where } \lambda_1 = \lambda_0 * (1 + 4 \text{ nm}/1544.33 \text{ nm}) = \lambda_0 * (1 + 2.59 * 10^{-3}).$$

This means that the maximum length-wise elongation (or shrinkage) of the spacer is 3 mm*2.59*10^-3. The thermal expansion coefficient of PTFE is 16*10^-5. Thus, to change the length of a PTFE spacer by 2.59*10^-3 the temperature needs to be changed by:

$$\Delta L = (2.59 * 10^{-3})/(16 * 10^{-5}) = 16.2° \text{ C}.$$

This is a relatively mild change in temperature.

Figure 1:
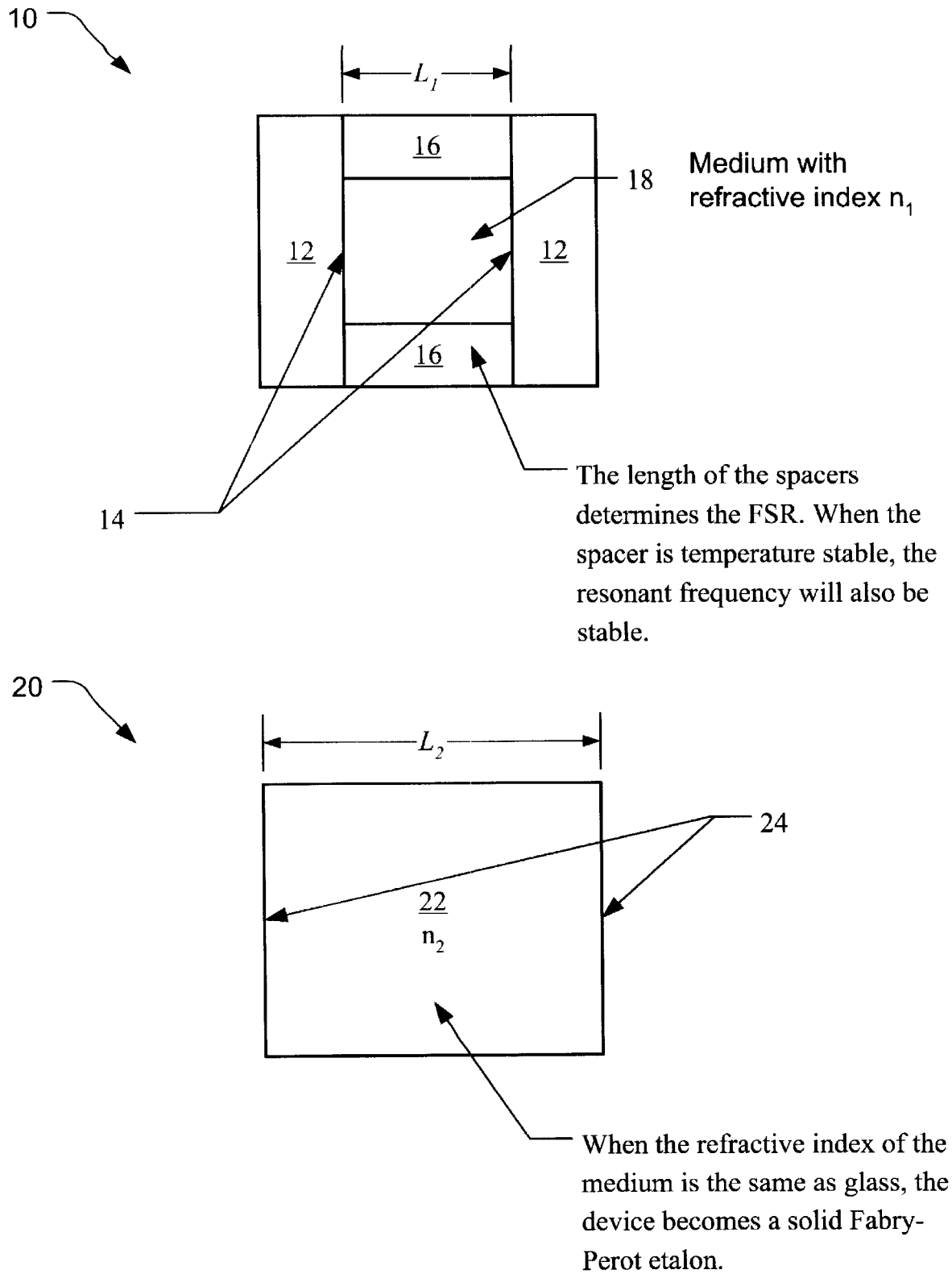
FIG. 1 (background art) is a block diagram that conceptually shows the structures of two Fabry-Perot etalons that are commonly used in wavelength lockers for fixed wavelength applications.
Figure 2:
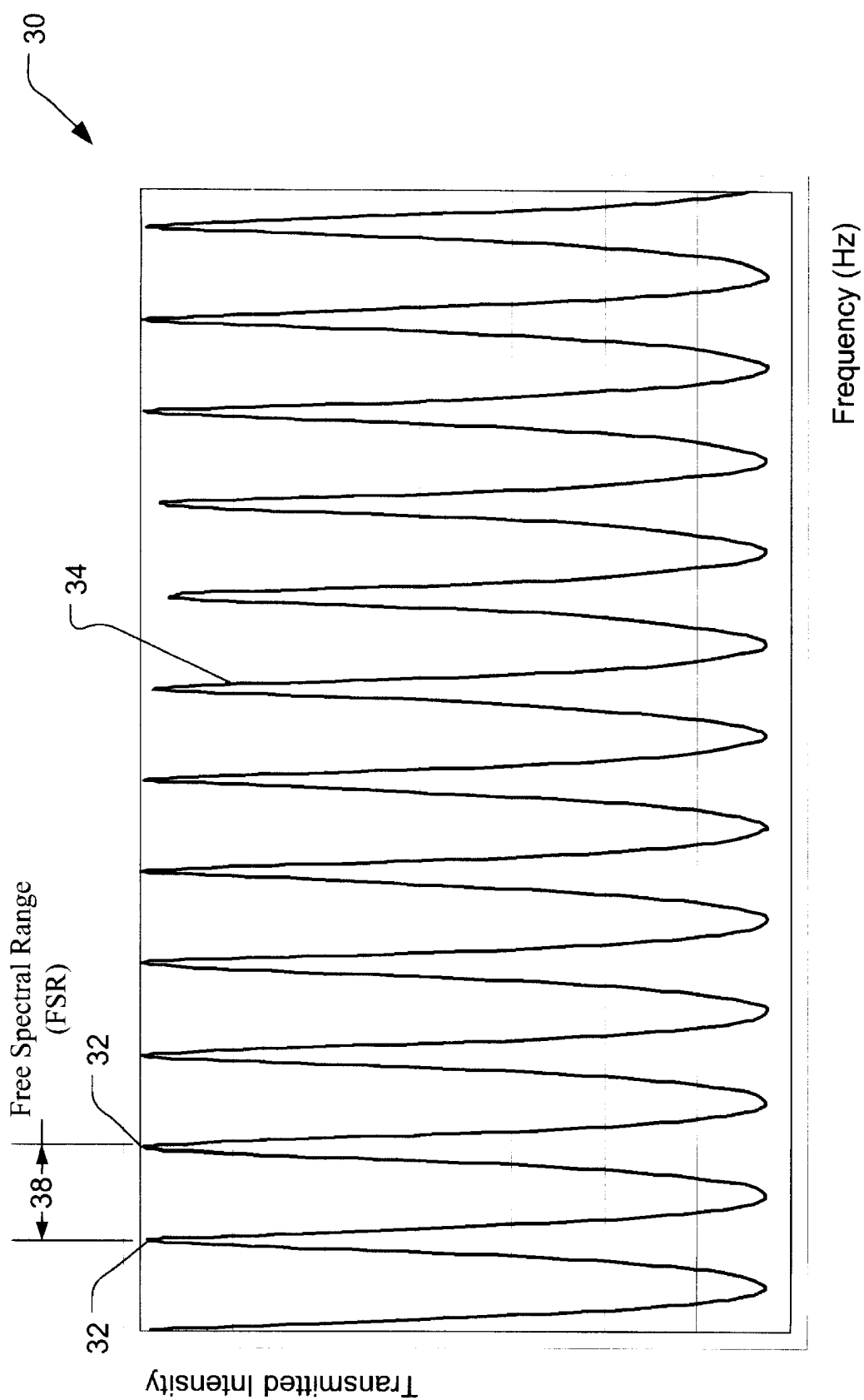
FIG. 2 (background art) is a graph showing a typical transmissive spectrum of a wavelength locker.
Figure 3:
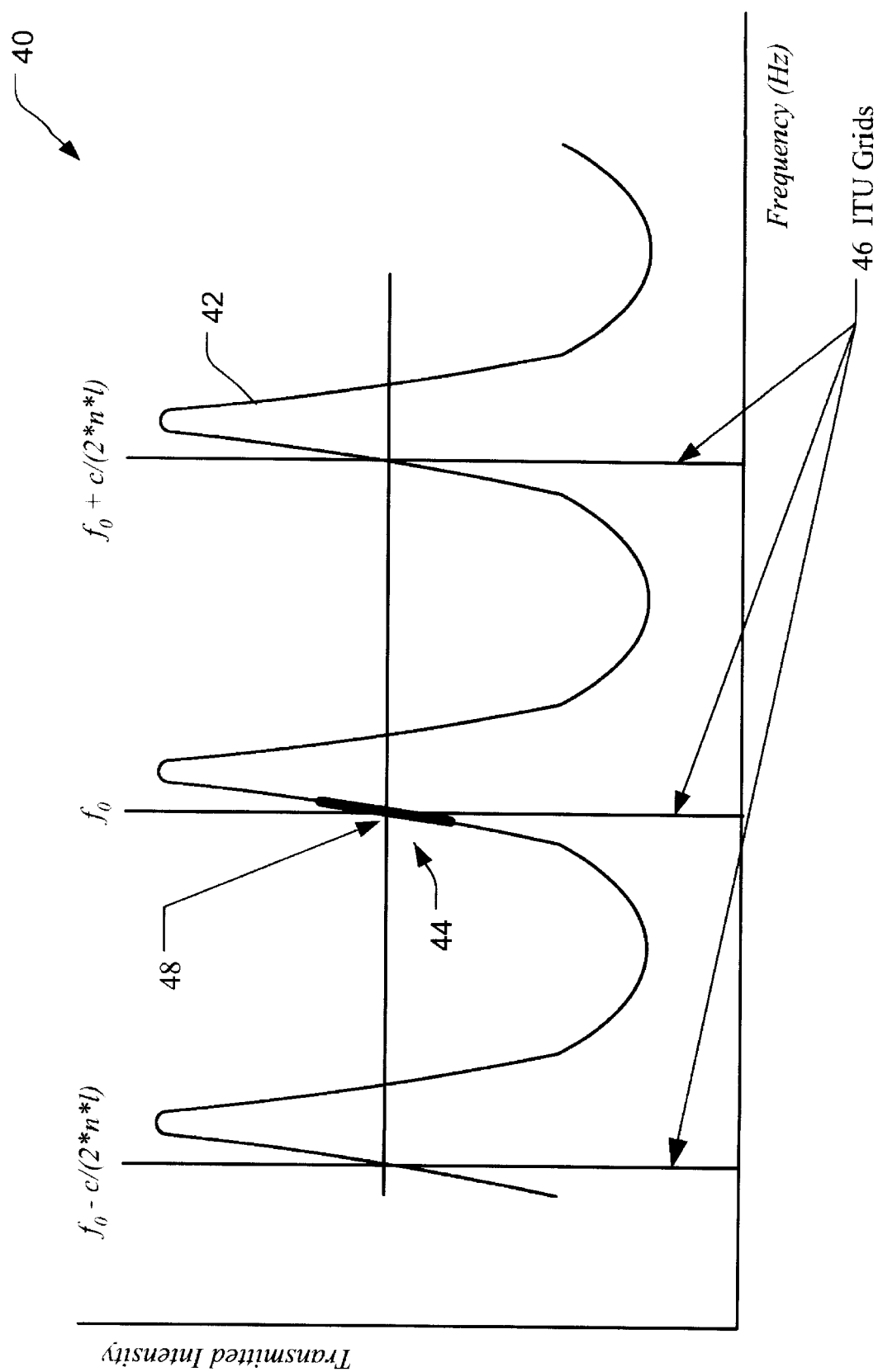
FIG. 3 (background art) is a graph showing, in simplified manner, the principle of a conventional wavelength locker using a Fabry-Perot etalon.

During tuning it can be critical to keep track of the amount the frequency is tuned. As was discussed with respect to FIG. 2, a fixed-spacing etalon produces peaks and valleys as the laser wavelength is varied. By counting the number of these peaks or valleys, one can tell how far a laser wavelength has been tuned.

Figure 7:
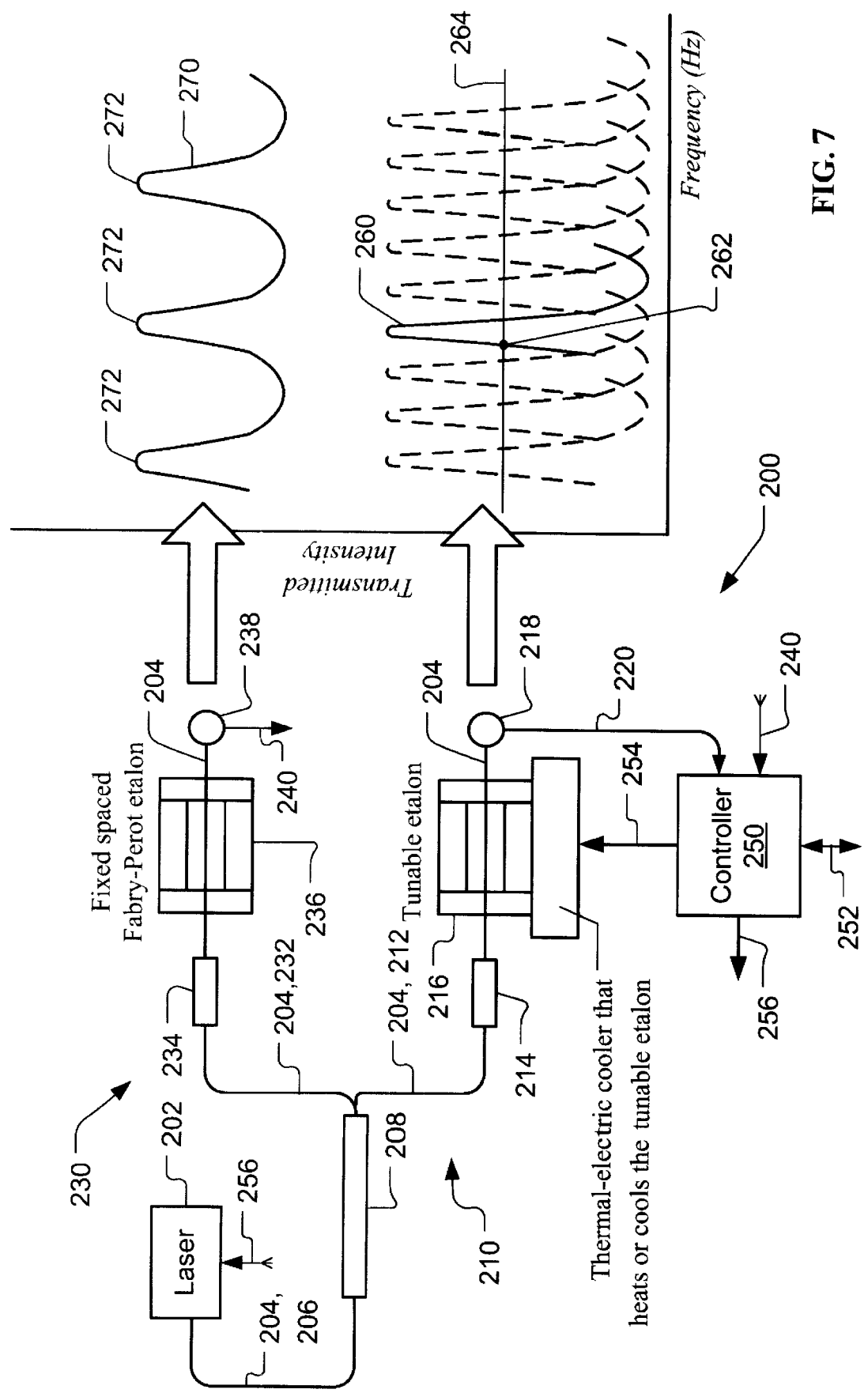
FIG. 7 is a stylized diagram showing application of a tunable wavelength locker in accord with the present invention in a tunable wavelength spectrum monitor.

FIG. 7 is a stylized diagram showing application of a tunable wavelength locker in accord with the present invention in a tunable wavelength spectrum monitor 200. Here the tunable wavelength locker and a fixed-spacing Fabry-Perot etalon in combination allow scanning a laser wavelength by a known amount. Since this combination performs not only laser wavelength locking, but also widerange frequency tuning, it becomes a "tunable wavelength spectrum monitor." The tunable wavelength spectrum monitor 200 includes a tunable laser 202 that outputs a laser beam 204 into a source optical fiber 206. A beam splitter 208 receives the laser beam 204 from the source optical fiber 206 and outputs a portion of it into a tuned channel 210.

The tuned channel 210 includes a tuned channel optical fiber 212 that receives a portion of the laser beam 204 from the beam splitter 208, and passes it through a tuned channel collimator 214. This portion of the laser beam 204 is then passed through a tunable etalon 216 to a tuned channel photodetector 218. Based upon the energy in the portion of the laser beam 204 reaching it, the tuned channel photodetector 218 then provides a tuned channel signal 220. Up to this point the apparatus described roughly corresponds to the tunable wavelength locker 100 of FIG. 4.

A fixed channel 230 is also provided. It includes a fixed channel optical fiber 232 that also receives a portion of the laser beam 204 from the beam splitter 208, and that passes it through a fixed channel collimator 234. This portion of the laser beam 204 is then passed through a fixed spaced etalon 236 to a fixed channel photodetector 238. Based upon the energy in the portion of the laser beam 204 reaching it, the fixed channel photodetector 238 then provides a fixed channel signal 240.

A controller 250, stylistically depicted simply as a block in FIG. 7, represents the control functionality of the tunable wavelength spectrum monitor 200. The controller 250 receives the tuned channel signal 220, the fixed channel signal 240, and input via an I/O link 252. Based on these, the controller 250 provides a etalon tuning signal 254 to the tunable etalon 216 and a laser tuning signal 256 to the tunable laser 202.

FIG. 7 includes a graphical depiction wherein a peak-valley curve 260 having a lock point 262 (e.g., corresponding with a 50% amplitude) represents the tuned channel signal 220. As the tunable etalon 216 is tuned (e.g., by heating or cooling), the peak-valley curve 260 will shift (a few possible positions are depicted with ghost outline in FIG. 7) and the lock point 262 will move accordingly, i.e., move only within the frequency domain (the set of possible positions are depicted by line 264).

The tuned channel 210 thus may operate similarly to the tunable wavelength locker 100 of FIG. 4. By setting the etalon tuning signal 254 to a specific value and setting the laser tuning signal 256 such that the tuned channel signal 220 coincides with the lock point 262, the tunable wavelength spectrum monitor 200 can be set to a specific frequency. With appropriate servo-control based on the tuned channel signal 220, the frequency of the tunable laser 202 can be locked to this frequency. Additionally, the tunable etalon 216 may now be tuned (e.g., by heating or cooling) so that the peak-valley curve 260 and the lock point 262 controllably shift, and with ongoing servo-control based on the tuned channel signal 220 the laser tuning signal 256 will change the frequency of the tunable laser 202 accordingly. In this manner the tunable wavelength spectrum monitor 200 can be scanned across a frequency range.

FIG. 7 further includes a graphical depiction wherein a peak-valley curve 270 having multiple peaks 272 represents the fixed channel signal 240. As the frequency of the tunable laser 202 changes the peaks 272 can be detected by the fixed channel photodetector 238 and counted by the controller 250. The tunable etalon 216 and the fixed spaced etalon 236 are preferably arranged to have the lock point 262 on the peak-valley curve 260 coincide with a peak 272 on the peak-valley curve 270 when the tunable etalon 216 is set to its middle range.

The combination of the tuned channel 210 and the fixed channel 230 (and the other components described) thus provides the tunable wavelength spectrum monitor 200 with the ability to be tuned to any frequency within and scanned across a large range of frequencies, typically a large multiple of the FSR of the fixed spaced etalon 236.

Figure 8:
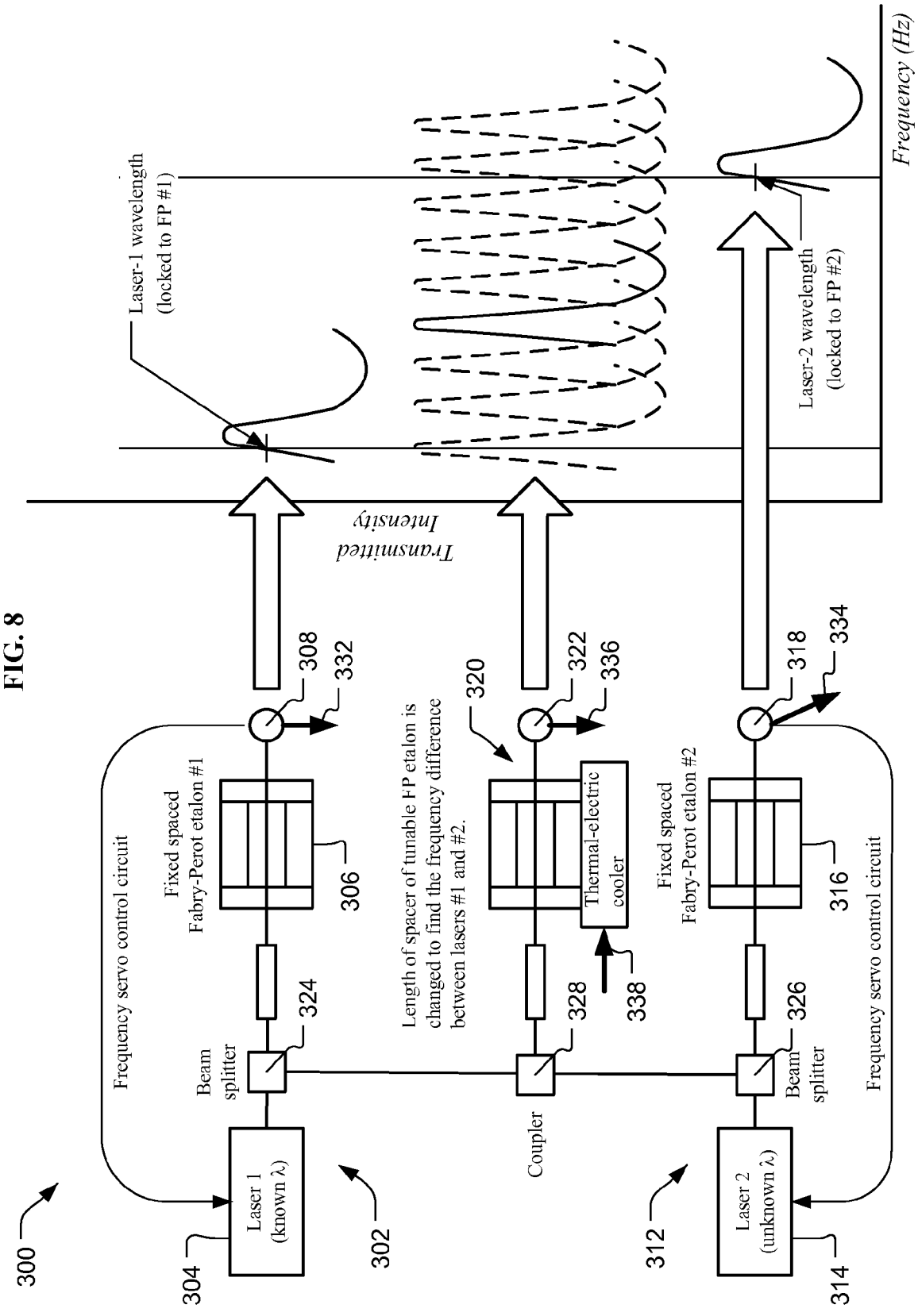
FIG. 8 is a stylized diagram showing application of a tunable wavelength locker in accord with the present invention in a relative wavelength measurement system.

FIG. 8 is a stylized diagram showing application of a tunable wavelength locker in accord with the present invention in a relative wavelength measurement system 300. This can be useful in a system having two light sources where the wavelength of one is known and finding the wavelength of the other is desired. Here a tunable Fabry-Perot etalon and two fixed-spaced Fabry-Perot etalons are used.

Briefly, the known wavelength light source is locked to the known wavelength and the unknown wavelength light source is locked so it does not change. The tunable etalon is then set to match its peak with the known wavelength. The spacer length of the tunable etalon is then changed (tuned) until the unknown wavelength is also at the peak. The amount of tuning required for this is the separation between the known and unknown wavelengths.

The relative wavelength measurement system 300 includes a first laser system 302 that has a first tunable laser 304, a first fixed spaced etalon 306, and a first photodetector. In combination these permit servo locking the first tunable laser 304 to emit light at a specific wavelength. Similarly, a second laser system 312 has a second tunable laser 314, a second fixed spaced etalon 316, and a second photodetector 318 that permit servo locking the second tunable laser 314 to emit light at a specific wavelength.

A tunable etalon assembly 320 and a third photodetector 322 are further provided, as well as a first beamsplitter 324, a second beamsplitter 326 and a coupler 328 to deliver part of the light from the first laser system 302 or the second laser system 312 to the tunable etalon assembly 320.

In practice, the first photo detector 308 generates a first detected signal 332, the second photodetector 318 generates a second detected signal 334, and the third photodetector 322 generates a third detected signal 336. An etalon tuning signal 338 is also provided, by a controller (not shown). The first laser system 302 is locked to emit light at a specific known wavelength using the first detected signal 332 and the second laser system 312 is locked to emit light at an unknown wavelength using the second detected signal 334.

When light from the first laser system 302 is coupled into the tunable etalon assembly 320 the etalon tuning signal 338 is adjusted to bring the third detected signal 336 to a particular point on the peak-valley curve, say, the peak. The value of the etalon tuning signal 338 is now recorded. Then light from the second laser system 312 is coupled into the tunable etalon assembly 320 and the etalon tuning signal 338 is changed as needed to bring the third detected signal 336 back to the same point on the peak-valley curve. Note, this is a phase adjustment, since the light from the respective laser systems 302, 312 will usually have different amplitudes in the third detected signal 336. The amount of change needed for the etalon tuning signal 338 represents the difference in the wavelength of the first laser system 302 and the second laser system 312.

To further know the amount of tuning used for this, the cavity length of the Fabry-Perot etalon can be calibrated against a group of known wavelengths (e.g., the 80 channels of ITU grids), for corresponding etalon temperature settings. A look-up table of wavelengths vs. etalon temperatures is then constructed and any unknown wavelength within the ITU grids can be found by checking against this look-up table. TBL. 1 is a table presenting an example set of ITU frequency verses etalon temperature and length look-up data that is suitable for use in this manner.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

What is claimed is:

1. A system for tuning the wavelength of a laser beam emitted by a tunable laser, comprising:
   a tunable etalon assembly including a Fabry-Perot ("FP") etalon and a thermal unit, wherein said FP etalon has paired reflectors to receive and wavelength filter the laser beam and said thermal unit thermally effects the separation of said paired reflectors in response to an etalon tuning signal;
   a photodetector suitable to receive the laser beam after filtering by said FP etalon and generate a detected signal based on transmitted intensity; and
   a controller suitable to:
      controllably generate said etalon tuning signal such that said thermal unit maintains said FP etalon at or changes said FP etalon to a specific temperature, thereby setting said paired reflectors to a corresponding separation where the FP etalon has a corresponding resonant frequency;
      select a lock point with respect to the transmitted intensity of the laser beam detected by said photodetector; and
      receive said detected signal and generate a laser tuning signal based thereon to control the tunable laser to emit the laser beam with a wavelength that results in the transmitted intensity coinciding with said lock point, thereby facilitating controllably tuning the wavelength of the laser beam emitted by the tunable laser.

2. The system of claim 1, wherein:
   said FP etalon is an air-spaced type etalon having at least one spacer separating said paired reflectors; and
   said thermal unit thermally changes the length of said at least one spacer, thereby also changing the separation of said paired reflectors.

3. The system of claim 1, wherein:
   said FP etalon is a solid type etalon having glass separating said paired reflectors; and
   said thermal unit thermally effects said glass, thereby changing the separation of said paired reflectors.

4. The system of claim 1, wherein said thermal unit includes an electrical resistance heating element.

5. The system of claim 1, wherein said thermal unit includes a thermal-electric cooler.

6. The system of claim 1, wherein said controller is further suitable to servo lock said laser tuning signal in response to said detected signal, thereby permitting locking the laser beam at a specific wavelength by maintaining said FP etalon at a specific temperature or scanning the laser beam across a range of wavelengths by adjusting said FP etalon through a range of temperatures.

7. The system of claim 1, wherein:
   said tunable etalon assembly further includes a temperature sensor suitable to provide a temperature signal; and
   said controller is further suitable to receive and employ said temperature signal when generating said etalon tuning signal.

8. A system for determining how much the wavelength of a laser beam emitted by a tunable laser has been tuned, the system comprising:
   a beamsplitter suitable to receive and split the laser beam into first and second beam portions;
   a tunable etalon assembly including a first Fabry-Perot ("FP") etalon and a thermal unit, wherein said first FP etalon has paired reflectors to receive and wavelength filter said first beam portion and said thermal unit thermally effects the separation of said paired reflectors in response to an etalon tuning signal;

a first photodetector suitable to receive said first beam portion after filtering and generate a first detected signal based on transmitted intensity;

a second FP etalon suitable to receive and wavelength filter said second beam portion;

a second photodetector suitable to receive said second beam portion after filtering and generate a second detected signal based on transmitted intensity;

a controller suitable to:
  generate said etalon tuning signal;
  receive said detected signal and generate a laser tuning signal based thereon, thereby facilitating controllably tuning the wavelength of the laser beam emitted by the tunable laser; and
  receive said second detected signal and counts peak-valley cycles therein, thereby facilitating determination of how much the wavelength of the laser beam emitted by the tunable laser has been tuned.

9. The system of claim 8, wherein:

said second FP etalon is part of a fixed space etalon assembly that includes a temperature sensor suitable to provide a temperature signal; and said controller is further suitable to receive and employ said temperature signal when generating said etalon tuning signal.

10. A system for determining the difference in wavelengths of a first laser beam emitted by a first tunable laser and a second laser beam emitted by a second laser, the system comprising:

a first beamsplitter suitable to receive and split the first laser beam into first and second beam portions;

a coupler suitable to alternately receive and redirect either of said second beam portion and the second laser beam as a tuning beam portion;

a first Fabry-Perot ("FP") etalon suitable to receive and wavelength filter said first beam portion;

a first photodetector suitable to receive said first beam portion after filtering and generate a first detected signal based on transmitted intensity;

a tunable etalon assembly including a tuning FP etalon and a thermal unit, wherein said tuning FP etalon has paired reflectors to receive and wavelength filter said tuning beam portion and said thermal unit thermally effects the separation of said paired reflectors in response to an etalon tuning signal;

a tuning photodetector suitable to receive said tuning beam portion after filtering and generate a tuning detected signal based on transmitted intensity;

a controller suitable to:
  receive said first detected signal and generate a first tuning signal based thereon to tune the first tunable laser to emit the first laser beam at a specific known wavelength;
  control said first tuning signal to servo lock the first laser beam to said known wavelength;
  generate said etalon tuning signal such that said tuning detected signal is at a known point on a peak-valley curve for said tuning FP etalon;
  record a first value for said etalon tuning signal when said tuning beam portion comes from the first laser beam and said tuning detected signal is at said known point;
  record a second value for said etalon tuning signal when said tuning beam portion comes from the second laser beam;
  generate said etalon tuning signal such that said second value matches said first value, thereby tuning said tunable etalon across the difference in wavelengths of the first and second tunable lasers;
  report on said first and second tuned values via an output link, thereby providing information about the difference said known wavelength emitted by said first tunable laser and the wavelength emitted by said second tunable laser.

11. The system of claim 10, the second laser is also tunable, and further comprising:

a second beamsplitter suitable to receive and split the second laser beam into third and fourth beam portions, wherein said third beam portion is received by the coupler:

a second FP etalon suitable to receive and wavelength filter said fourth beam portion;

a second photodetector suitable to receive said fourth beam portion after filtering and generate a second detected signal based on transmitted intensity; and said controller further suitable to receive said second detected signal and controllably generate a second tuning signal based thereon to servo lock the second tunable laser to emit the second laser beam at a specific wavelength.

* * * * *